(12) United States Patent
Chen et al.

(10) Patent No.: US 12,348,866 B2
(45) Date of Patent: Jul. 1, 2025

(54) AUTO FOCUS METHOD USING IMAGE DISPARITY AND IMAGE CAPTURING DEVICE USING AUTO FOCUS METHOD

(71) Applicant: MEDIATEK INC., Hsin-Chu (TW)

(72) Inventors: Chun-Hung Chen, Hsinchu (TW); Yun Hsuan, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 134 days.

(21) Appl. No.: 18/200,589

(22) Filed: May 23, 2023

(65) Prior Publication Data

US 2024/0397203 A1  Nov. 28, 2024

(51) Int. Cl.
*H04N 23/67* (2023.01)

(52) U.S. Cl.
CPC ......... *H04N 23/675* (2023.01); *H04N 23/672* (2023.01); *H04N 23/673* (2023.01)

(58) Field of Classification Search
CPC ... H04N 23/675; H04N 23/672; H04N 23/673
See application file for complete search history.

(56) References Cited

U.S. PATENT DOCUMENTS

| | | | | |
|---|---|---|---|---|
| 2014/0139644 | A1* | 5/2014 | Ueda | H04N 23/67 348/49 |
| 2017/0019589 | A1* | 1/2017 | Moon | H04N 5/145 |
| 2018/0196221 | A1* | 7/2018 | Sun | H04N 23/61 |
| 2019/0066271 | A1* | 2/2019 | Kanbara | H04N 23/67 |

\* cited by examiner

*Primary Examiner* — Gevell V Selby
(74) *Attorney, Agent, or Firm* — Winston Hsu (57) ABSTRACT

An auto focus method for an image capturing device with a PD image sensor, comprising: (a) receiving pixel values of a sensing image sensed by the PD image sensor; (b) dividing the sensing image into a plurality of image blocks; (c) computing first cost values of each of the image blocks; (d) determining disparities of each of the image blocks according to the first cost values with in a specific range of each of the image blocks; (e) finding at least one object in the sensing image according to the disparities; and (f) setting a focus location of the image capturing device according at least one object location of the object.

14 Claims, 10 Drawing Sheets

AUTO FOCUS METHOD USING IMAGE DISPARITY AND IMAGE CAPTURING DEVICE USING AUTO FOCUS METHOD

BACKGROUND

In the related art, a depth map may be generated by one or more cameras, for example, by a depth camera or a stereo camera. Also, a disparity histogram can be acquired based on the depth map. The disparity histogram means a visualization of disparities or depth in the scene based on a distribution of pixels over perceived disparity levels (or depth values) associated with the objects of the scene. Objects in the scene can be found based on the disparity histogram. After that, the camera can compute a focus location according to the locations of the found objects. However, adjacent objects could not be distinguished if the objects are computed only according to the disparity histogram.

SUMMARY

One objective of the present invention is to provide an auto focus method which can distinguish close objects.

Another objective of the present invention is to provide an image capturing device which can distinguish close objects.

One embodiment of the present invention discloses an auto focus method for an image capturing device with a PD image sensor, comprising: (a) receiving pixel values of a sensing image sensed by the PD image sensor; (b) dividing the sensing image into a plurality of image blocks; (c) computing first cost values of each of the image blocks; (d) determining disparities of each of the image blocks according to the first cost values with in a specific range of each of the image blocks; (e) finding at least one object in the sensing image according to the disparities; and (f) setting a focus location of the image capturing device according at least one object location of the object.

Another embodiment of the present invention discloses an image capturing device, comprising: a PD image sensor, configured to sense a sensing image; and a processing circuit, configured to perform following steps: (a) receiving pixel values of a sensing image sensed by the PD image sensor; (b) dividing the sensing image into a plurality of image blocks; (c) computing first cost values of each of the image blocks; (d) determining disparities of each of the image blocks according to the first cost values with in a specific range of each of the image blocks; (e) finding at least one object in the sensing image according to the disparities; and (f) setting a focus location of the image capturing device according at least one object location of the object.

In view of above-mentioned embodiments, the objects can be clearly distinguished even if the objects are close while the image capturing device automatically setting a focus position. Thereby a proper focus location can be acquired.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. It will be appreciated that the system, the device, the apparatus or the module depicted in following embodiments can be implemented by hardware (ex. circuit) or the combination of hardware and software (ex. a processing unit executing at least one program). The term "first", "second", "third" in following descriptions are only for the purpose of distinguishing different one elements, and do not mean the sequence of the elements. For example, a first device and a second device only mean these devices can have the same structure but are different devices.

Figure 1:
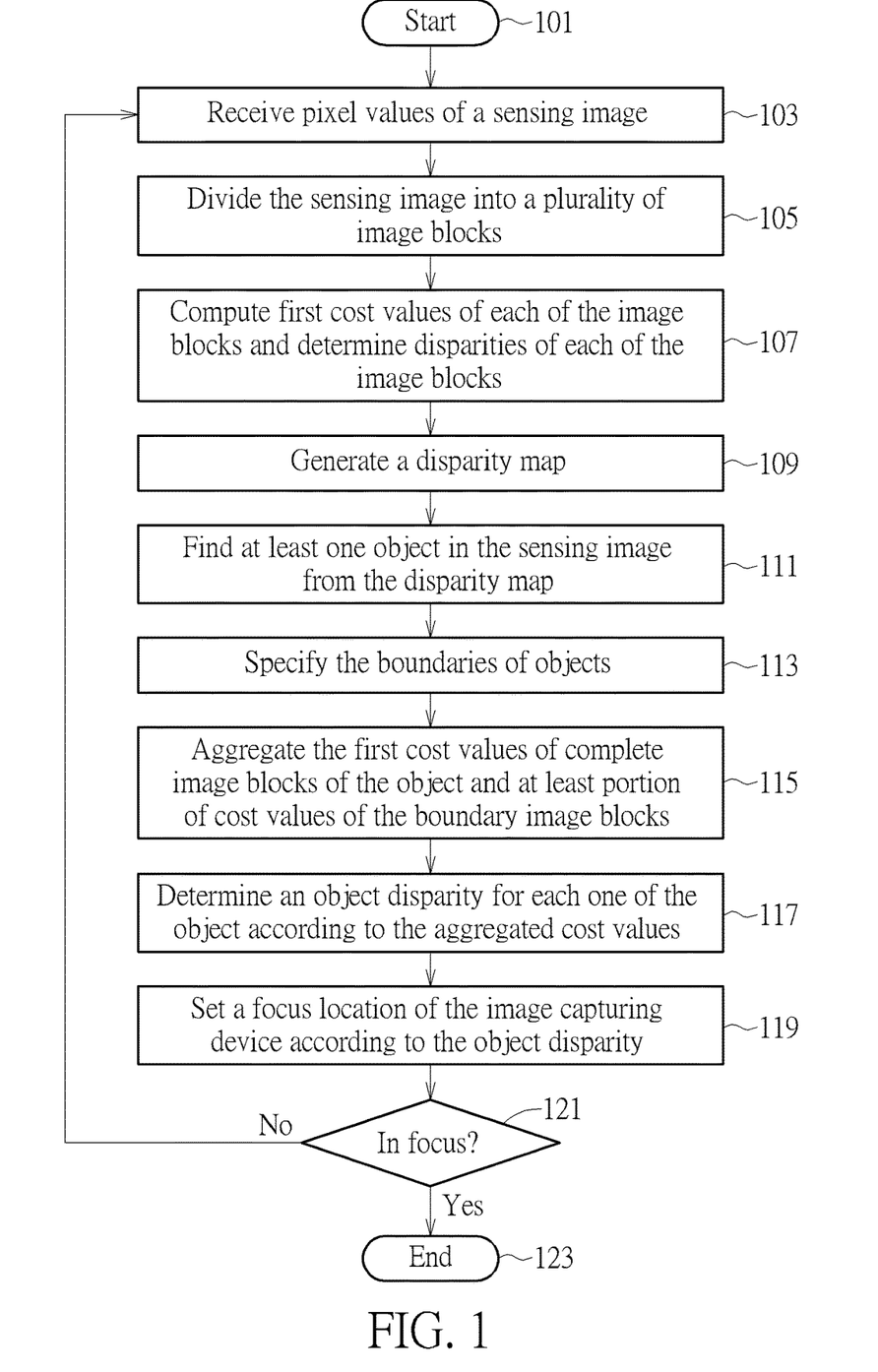
FIG. 1 is a flow chart illustrating an auto focus method according to one embodiment of the present application.

FIG. 1 is a flow chart illustrating an auto focus method according to one embodiment of the present application. The auto focus method is applied to an image capturing device with a PD (phase detection) image sensor. The auto focus method comprises:

Step 101

The auto focus procedure starts.

In one embodiment, the auto focus procedure starts when the image capturing device is triggered to be active.

Step 103

Receive pixel values of a sensing image (i.e., a scene) sensed by the PD image sensor.

The PD image sensor may have phase detection pixels. For example, a metal mask over the image sensor can be provided to create the left and right phase detection pixels. However, the PD image sensor is not limited to comprise such structure. The PD image sensor with any other structure can also be applied to the present application.

Step 105

Divide the sensing image into a plurality of image blocks.

Step 107

Compute first cost values of each of the image blocks and determine disparities of each of the image blocks according to the first cost values.

Step 109

Generate a disparity map with disparities of all image blocks.

Step 111

Find at least one object in the sensing image from the disparity map.

Step 113

Specify the boundaries of objects.

Step 115

Aggregate the first cost values of complete ones of the image blocks of the object and at least portion of cost values of the boundary image blocks of the object, to generate aggregated cost values.

Step 117

Determine an object disparity for each one of the object according to the aggregated cost values.

Step 119

Set a focus location of the image capturing device according to the object disparity.

In one embodiment, the step 119 is automatically performed by the image capturing device after the computation of the focus location is completed.

Step 121

Check if the sensing image is in focus or not, if not, go back to the step 103 to restart the autofocus, and if yes, go to step 123.

In one embodiment, if the sensing image is out of focus, the images generated by different groups of phase detection pixels have offset. On the contrary, if the sensing image is in focus, the images generated by different groups of phase detection pixels are identical or have very few differences.

In one embodiment, the disparity corresponds to lens position displacement of lens on the phase detection pixels. For example, the lens position displacement is [−20, 20] *slope. The slope can be a constant value, and the signs [−, +] of [−20, 20] mean the directions of the lens position displacement. Also, the disparity means offset between different groups of lens, for example, L (left) lens and R (right) lens.

Accordingly, the step 121 can check if the sensing image is in focus or not by such mechanism, but not limited. Any other mechanism can be applied to check if the sensing image is in focus or not.

Step 123

The auto focus procedure ends.

It should be noted that the term "auto focus" means a reference location could be automatically provided by the image capturing device. Based on the reference focus location, a user of the image capturing device or the image capturing device itself can decide if the reference focus location should be adopted or not.

Figure 2:
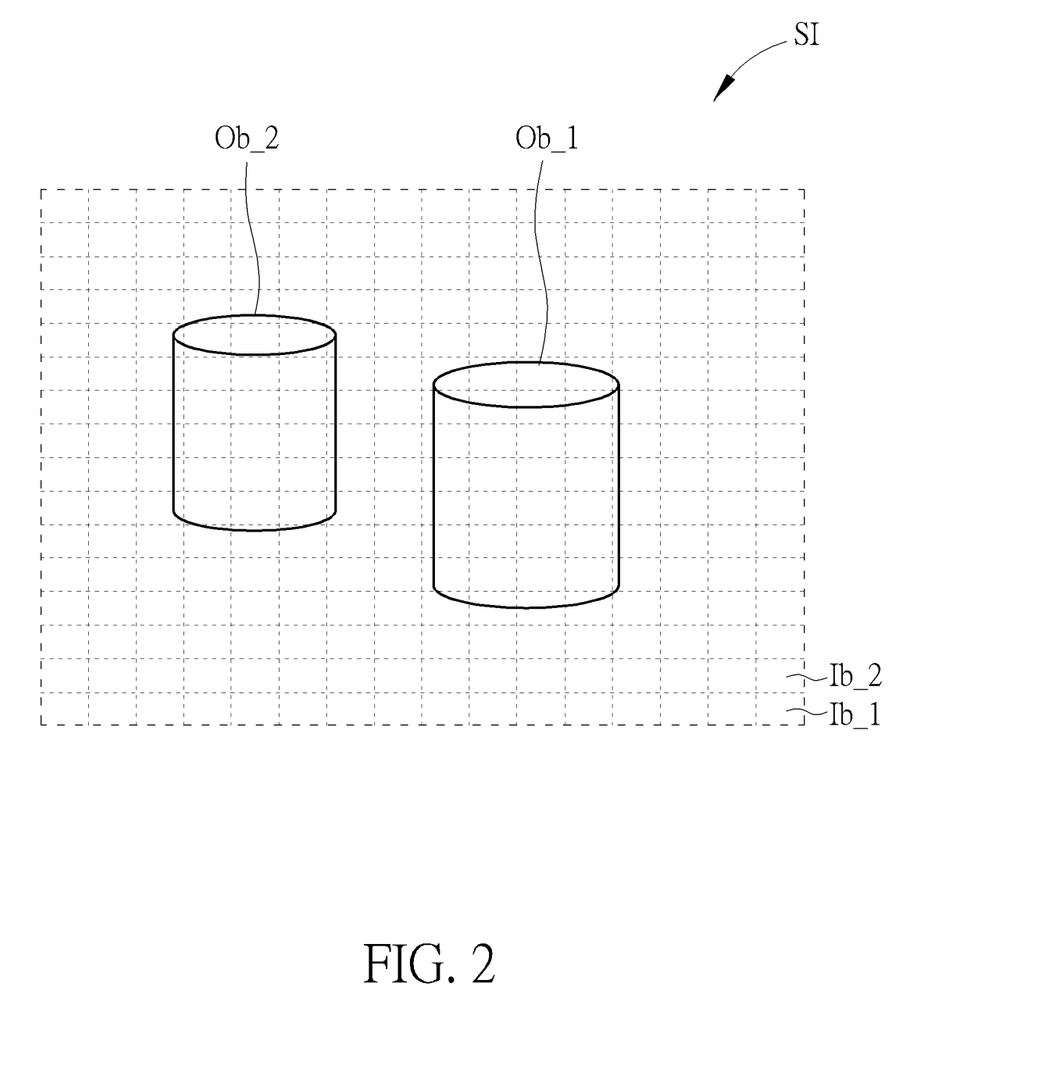
FIG. 2 and FIG. 3 are schematic diagrams illustrating image blocks and cost values, according to embodiments of the present application.
Figure 3:
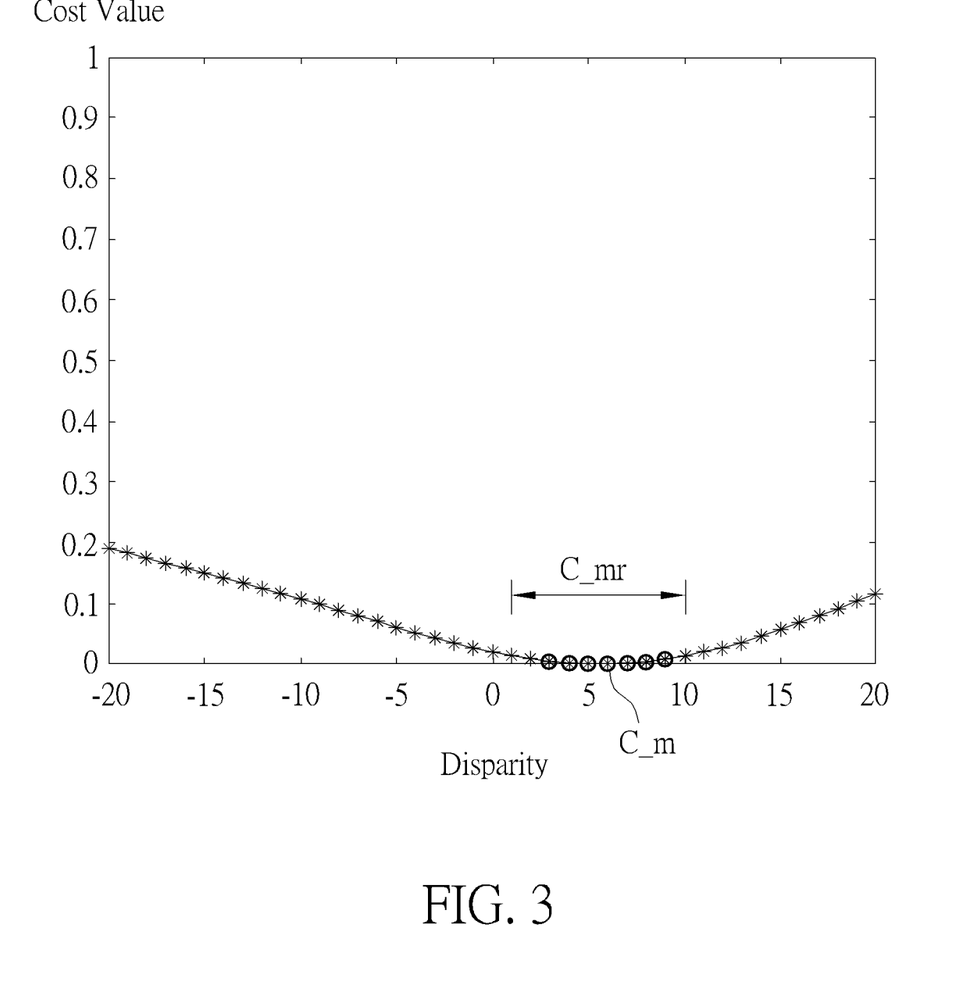

Details of the steps illustrated in FIG. 1 are described in following descriptions. FIG. 2 and FIG. 3 are schematic diagrams illustrating image blocks and cost values (steps 105, 107), according to embodiments of the present application. As shown in FIG. 2, the sensing image SI is divided into a plurality of image blocks (only two image blocks Ib_1, Ib_2 are symbolized for explaining). In following embodiments, the sensing image SI comprises only two objects Ob_1, Ob_2 in the foreground. However, the sensing image SI may comprises only one object or more than two objects. Further, the sensing image SI may comprise objects in the background.

Then, first cost values of each of the image blocks Ib_1, Ib_2 . . . are computed and disparities (phase shifts) of each of the image blocks Ib_1, Ib_2 . . . are determined according to the first cost values. In one embodiment, disparities are determined according to the first cost values within a specific range of each of the image blocks Ib_1, Ib_2 . . . . For example, the disparities are determined according to a minimum one of the first cost values (i.e., the point C_m).

For another example, the disparities are determined according to a predetermined range of a minimum one of the first cost values (i.e., the range C_mr).

Figure 4:
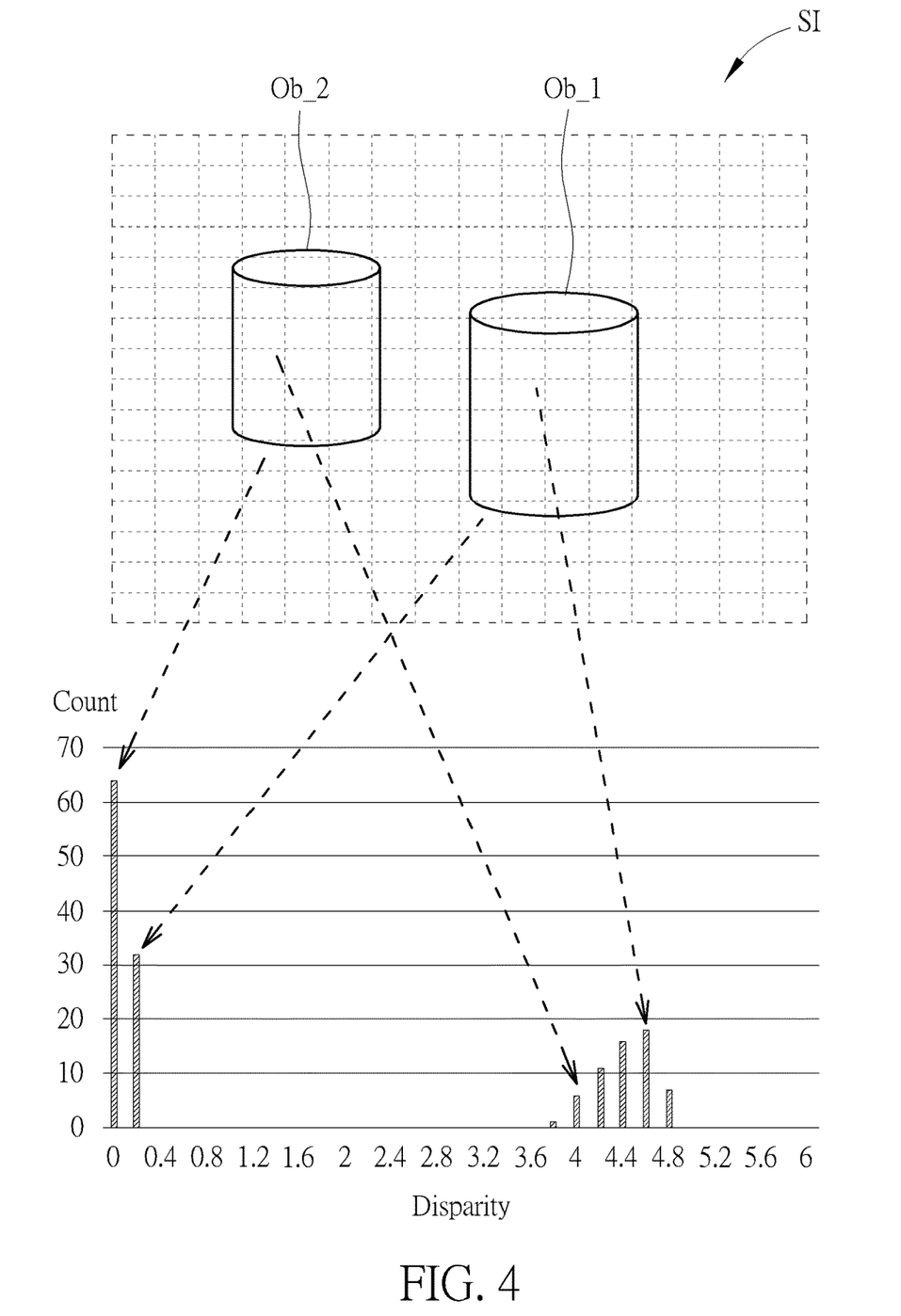
FIG. 4 is a schematic diagram illustrating the disparity map, according to one embodiment of the present application.

FIG. 4 is a schematic diagram illustrating the disparity map (step 109), according to one embodiment of the present application. Disparities of the objects in the foreground always fall in a range different from the range of disparities of the background. For example, in the embodiment of FIG. 4, disparities of the objects Ob_1, Ob_2, which are objects in the foreground, fall in a range of 3.8-4.8. However, disparities of the background fall in a range of 0-0.4. The disparity map contains distributions of the disparities of the objects Ob_1, Ob_2, and contains distributions of the background. Accordingly, the objects Ob_1, Ob_2 in the sensing image SI may be found according to the disparity map (step 111).

Figure 5:
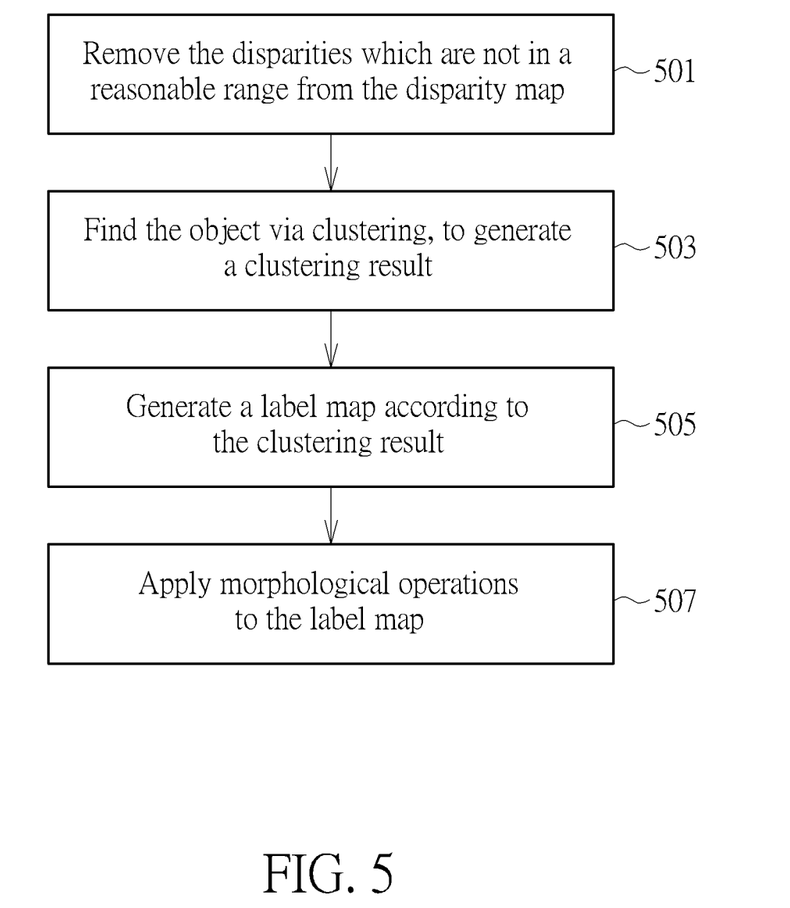
FIG. 5 is a flow chart illustrating detail steps of finding objects according to the disparity map, according to one embodiment of the present application.

In one embodiment, the step 111 comprises the steps illustrated in FIG. 5. However, if the sensing image SI has strong features or a high quality, the object can be found only according to the disparity map without the steps illustrated in FIG. 5, or can be found by only a portion of the steps illustrated in FIG. 5.

FIG. 5 comprises following steps:

Step 501

Remove the disparities which are not in a reasonable range from the disparity map.

In one embodiment, the image capturing device comprises a lens. In such case, the reasonable range is determined according at least one of: a current position of the lens, a maximum position of the lens and a minimum position of the lens. Details of the lens will be described in following descriptions.

Step 503

Find the object via clustering, to generate a clustering result.

The clustering can be replaced by any other image segmentation method, thus the clustering result can be regarded as an image segmentation result.

Step 505

Generate a label map according to the clustering result.

The label map can be replaced by any other image classification method, thus the label map can be regarded as an image classification map.

Step 507

Apply morphological operations to the label map.

The morphological operation can be replaced by any other image shape feature enhancement method.

Figure 6:
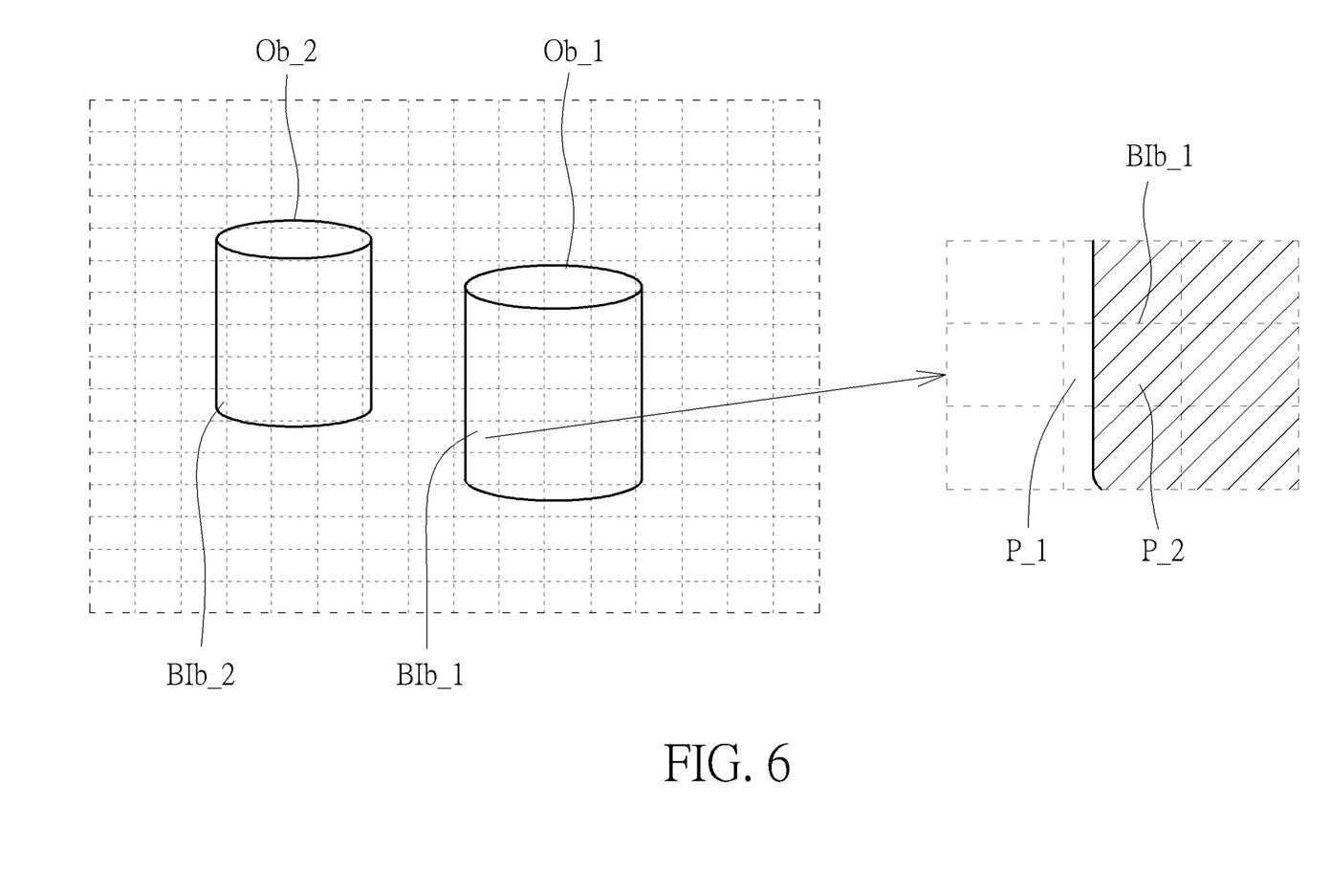
FIG. 6 is a schematic diagram illustrating the step of specifying boundaries, according to one embodiment of the present application.
Figure 7:
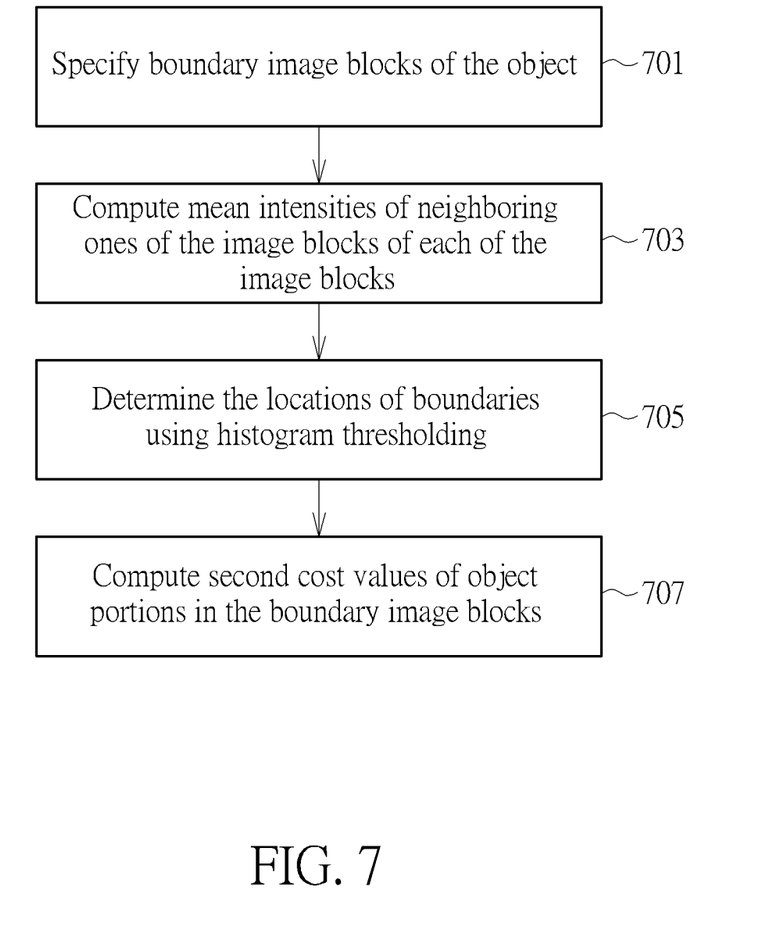
FIG. 7 is a flow chart illustrating detail steps of specifying boundaries, according to one embodiment of the present application.

In one embodiment, via the step 111 or the steps in FIG. 5, the main shape of objects may be roughly found. However, some image blocks may cross between two objects, or cross an object and background. Such image blocks are called boundary image blocks. Accordingly, in the step 113, the boundaries of objects Ob_1, Ob_2 are specified. In one embodiment, the step 113 can be omitted if the main shape of objects found in the step 111 is clear enough. FIG. 6 is a schematic diagram illustrating the step of specifying boundaries, according to one embodiment of the present application. FIG. 7 is a flow chart illustrating the step of specifying boundaries, according to one embodiment of the present application. Please also refer to FIG. 6 while referring to FIG. 7, to understand the concepts of the present invention for more clarity. It will be appreciated that the boundaries of objects are not limited to be specified via the steps illustrated in FIG. 7.

In the embodiment of FIG. 6, the objects Ob_1, Ob_2 respectively comprise boundary image blocks, such as the boundary image blocks BIb_1, BIb_2 (only two of the boundary image blocks are symbolized for explaining). Further, as shown in FIG. 6, the boundary image block BIb_1 comprises the pixels of the object Ob_1 and the pixels of background. Accordingly, in one embodiment, the boundaries may be specified via the steps illustrated in FIG. 7, which comprises following steps:

Step 701

Specify boundary image blocks of the object.

As above-mentioned, image blocks may cross between two objects, or cross an object and background. Thus, in one embodiment, the boundary image blocks can be specified according to pixel values of the image blocks.

Step 703

Compute mean intensities of neighboring ones of the image blocks of each of the image blocks.

For example, in the embodiment of FIG. 6, mean intensities of neighboring image blocks of the boundary image block BIb_1 are computed, and mean intensities of neighboring image blocks of the boundary image block BIb_2 are computed.

Step 705

Determine the locations of boundaries using histogram thresholding. For example, a histogram threshold can be selected based on the mean intensities of neighboring image blocks of the boundary image block BIb_1 or BIB_2 to find the boundary.

In some embodiments, the histogram thresholding can be replaced by other suitable image segmentation method, such as edge detection.

Step 707

Compute second cost values of object portions in the boundary image blocks.

Please note, the second cost value mentioned here mean the cost values of portions in the boundary image blocks, but the above-mentioned first cost values mean the cost values of a whole image block.

For example, in the embodiment of FIG. 6, the boundary image block BIb_1 comprises two portions P_1, P_2. The portion P_1 is a non-object portion, and the portion P_2 is an object portion. As stated in the above step 115, in one embodiment, only the second cost values of object portions (such as portion P_2) are computed and aggregated with the first cost value of the object Ob_1, and the second cost values of non-object portions (such as portion P_1) are not computed, or computed but not aggregated. In another embodiment, the second cost values of non-object portions and object portions are all computed and aggregated with the first cost values of non-object and object, respectively.

In another example, portion P_1 and portion P_2 are object portions belonging to first object Ob_1 and second object Ob_2, respectively. As stated in the above step 115, in one embodiment, the first cost values of the first object Ob_1 are aggregated with the second cost values of the portion P_1, and the first cost values of the second object Ob_2 are aggregated with the second cost values of the portion P_2. As such, different objects can be distinguished based on the different aggregations.

As stated in FIG. 1, after the aggregated cost values are generated. The object disparity for each one of the object Ob_1, Ob_2 . . . is determined according to the aggregated cost values (step 117). In one embodiment, the step 117 also determines a final disparity of the whole sensing image SI. Afterwards, a focus location of the image capturing device may be automatically provided according to the object disparity (step 119).

In view of above-mentioned descriptions, the step 111 is not limited to comprise the steps illustrated in FIG. 5, and the step 113 can be omitted if the main shape of objects found in the step 111 is clear enough. Also, the step of determining a focus location according to the object location found in the step 111 can comprise other steps, rather than limited to the steps 115, 117 and 119. Accordingly, the auto focus method provided by the present invention can be summarized as following steps in FIG. 8:

Step 801

Figure 8:
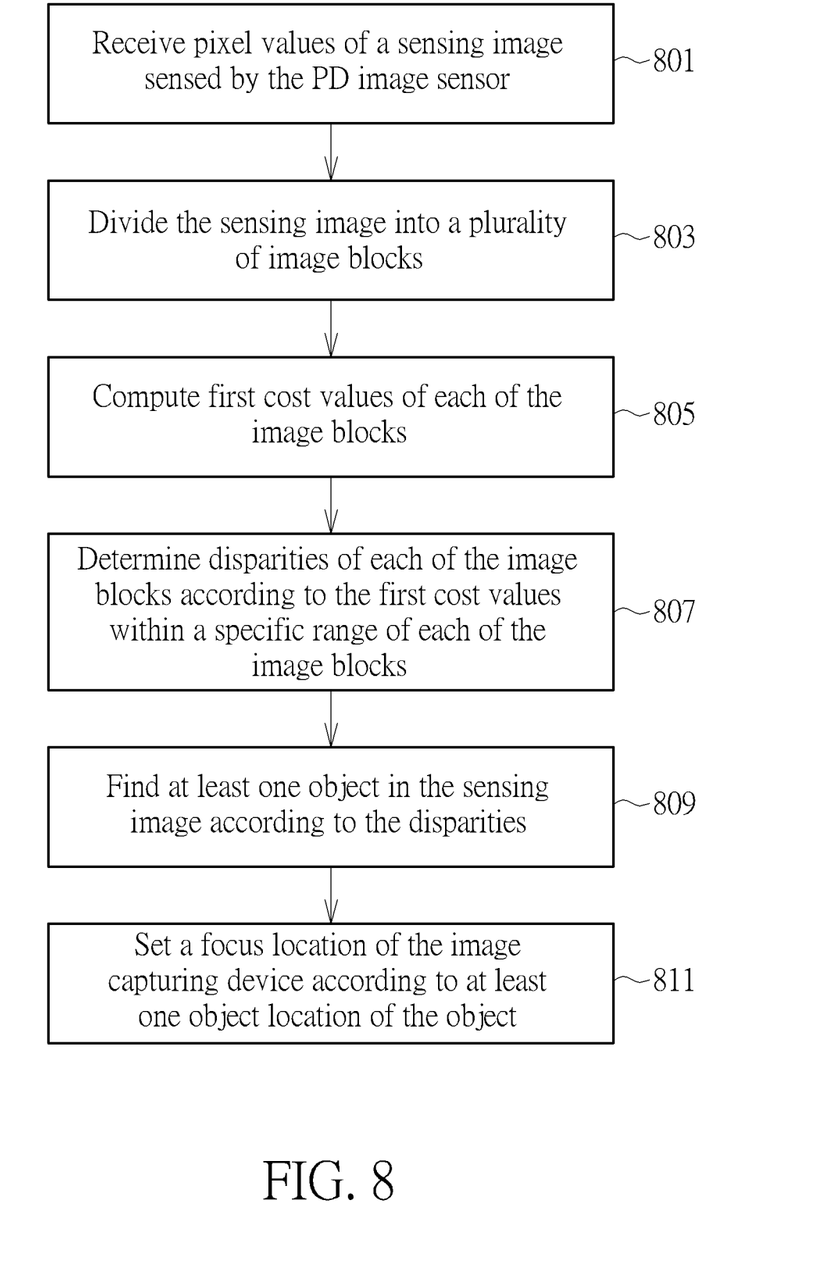
FIG. 8 is a flow chart illustrating a summary of an auto focus method according to one embodiment of the present application.

Receive pixel values of a sensing image sensed by the PD image sensor. The step 801 may correspond to the step 103.

Step 803

Divide the sensing image into a plurality of image blocks. The step 801 may correspond to the step 105.

Step 805

Compute first cost values of each of the image blocks. The step 805 may correspond to the step 107.

Step 807

Determine disparities of each of the image blocks according to the first cost values within a specific range of each of the image blocks.

The step 807 may correspond to the step 107 and the steps in FIG. 3.

Step 809

Find at least one object in the sensing image according to the disparities.

For example, in the step 109, a disparity map is generated according to the disparities, and the object is found according to the disparity map in the step 111.

Step 811

Set a focus location of the image capturing device according to at least one object location of the object.

As above-mentioned, the step 113 can be omitted and the step of determining a focus location according to the object location found in the step 111 is not limited to the steps 115, 117 and 119. Accordingly, the step 811 can be acquired.

Figure 9:
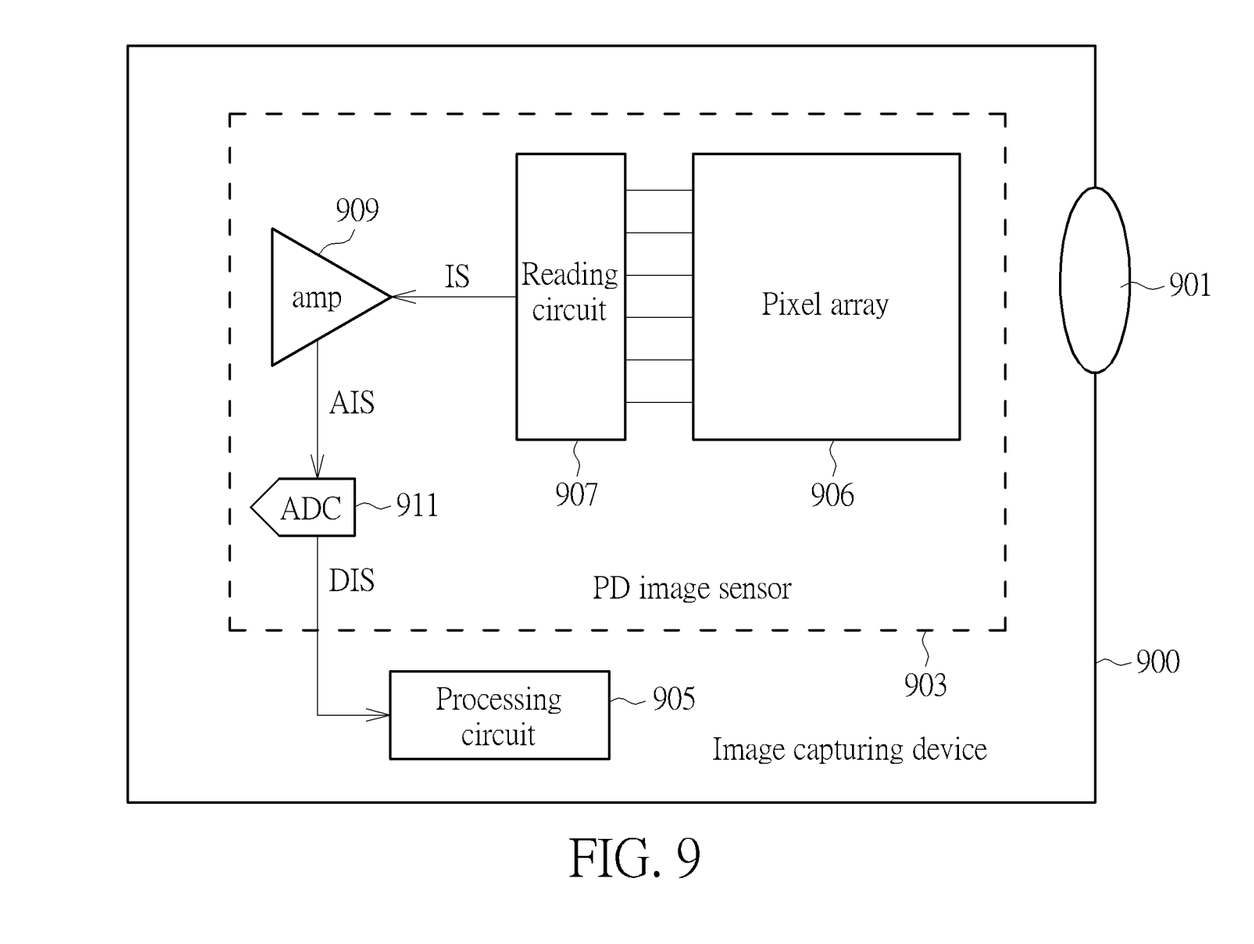
FIG. 9 is a block diagram illustrating an image capturing device according to one embodiment of the present application.

FIG. 9 is a block diagram illustrating an image capturing device 900 according to one embodiment of the present application. It will be appreciated that the auto focus method illustrated in above-mentioned embodiments is not limited to be implemented by the image capturing device 900 in FIG. 9. In one embodiment, the image capturing device 900 is a camera, and may be an independent electronic device or be integrated to another electronic device such as a mobile phone or a tablet computer.

As shown in FIG. 9, the image capturing device 900 comprises a lens 901, a PD image sensor 903 and a processing circuit 905. The lens 901 may be the lens stated in the step 501. In such case, the maximum position of the lens may mean a possible location of the lens 901, which has a maximum distance from the PD image sensor 903. Oppositely, the minimum position of the lens may mean a possible location of the lens 901, which has a minimum distance from the PD image sensor 903.

The PD image sensor 903 in FIG. 9 comprises a pixel array 906, a reading circuit 907, an image signal amplifying circuit 909, and an ADC 911. The pixel array 906 comprises a plurality of pixels which generate sensing charges corresponding to the received light passing through the lens 901. The pixels comprise above-mentioned PD pixels. However, the pixel array 906 may also comprise normal pixels. The reading circuit 907 is configured to read the charges to generate image signals (only using an image signal IS as an example for explaining) corresponding to the sensing charges generated by the pixels.

The image signal amplifying circuit 909 is configured to amplify the image signal IS to generate an amplified image signal AIS. The amplified image signal AIS is transmitted to an ADC 911 to generate a digital image signal DIS (the pixel values of the sensing image SI). The digital image signal DIS is transmitted to a processing circuit 905, which may perform the above-mentioned embodiments of the auto focus method. The processing circuit 905 may be integrated to the PD image sensor 903 or independent from the PD image sensor 903.

Figure 10:
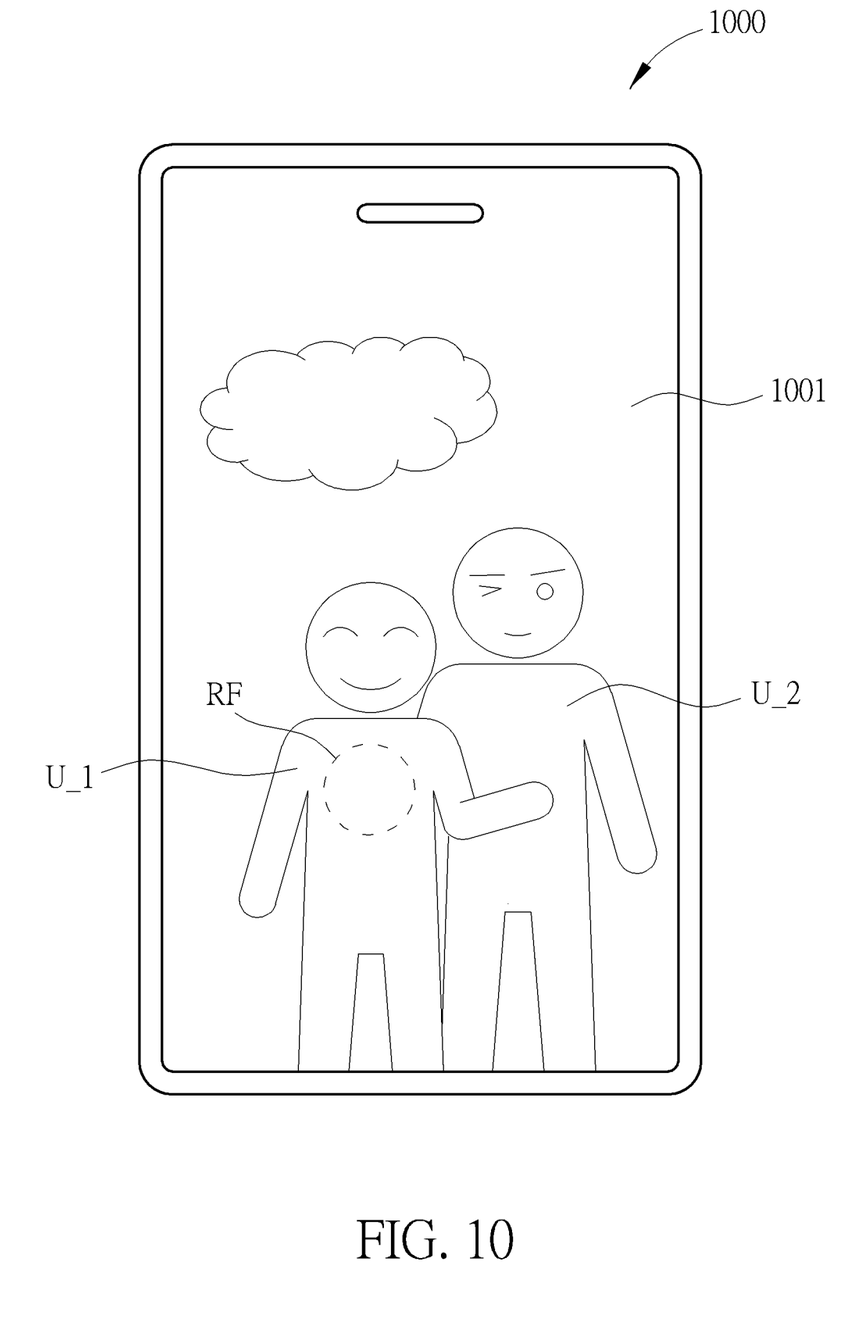
FIG. 10 is a schematic diagram illustrating a practical example of an image capturing device disclosed in the present application.

FIG. 10 is a schematic diagram illustrating a practical example of an image capturing device disclosed in the present application. In the embodiment of FIG. 10, the image capturing device is a camera integrated to mobile phone 1000. In such case, if the camera is activated, a preview scene 1001 is displayed, and a user can trigger a button or an icon to capture the preview scene 1001. In such example, the focus location of the camera can be automatically provided based on above-mentioned embodiments. However, the user can still manually set the focus location rather than limited to user to the provided focus position. For example, the user can touch a location on the preview scene 1001 to set a desired focus location. However, the camera 1001 is not limited to be integrated to a mobile phone. The camera 1001 can be integrated to any other electronic device such as a tablet computer. Further, the camera 1001 can be an independent electronic device such as a DSLR (digital single-lens reflex camera). In such case, the user may use a viewfinder while capturing a photo thus no preview scene is displayed, but the camera can still perform the auto focus method disclosed in above-mentioned embodiments.

Also, as above-mentioned, in one embodiment, after the object disparity is generated, the image capturing device does not set the focus location automatically. Oppositely, a reference focus location can be provided, and a user of the image capturing device or the image capturing device itself can decide if the reference focus location should be adopted or not. For example, in the example of FIG. 10, a reference focus location RF can be shown, and the user can directly touch the reference focus location RF to take a photo.

As shown in the example of FIG. 10, two persons U_1, U_2 (i.e., two objects) are close. The persons U_1, U_2 could not be clearly distinguished in the prior art, thus the focus location which is automatically set may not be proper. However, the persons U_1, U_2 can be clearly distinguished based on the methods disclosed in above-mentioned embodiments, thus a proper auto focus position can be acquired.

In view of above-mentioned embodiments, the objects can be clearly distinguished even if the objects are close while the image capturing device automatically setting a focus position. Thereby a proper focus location can be acquired.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto focus method for an image capturing device with a PD (phase detection) image sensor, comprising:
    (a) receiving pixel values of a sensing image sensed by the PD image sensor;
    (b) dividing the sensing image into a plurality of image blocks;
    (c) computing first cost values of each of the image blocks;
    (d) determining disparities of each of the image blocks according to the first cost values within a specific range of each of the image blocks;
    (e) finding at least one object in the sensing image according to the disparities; and
    (f) setting a focus location of the image capturing device according to at least one object location of the object;
    wherein the auto focus method further comprises:
    generating a disparity map of the disparities in the step (d), wherein the step (e) finds the object according to the disparity map, wherein the step (e) finds the object via an image segmentation method;
    generating an image classification map according to an image segmentation result generated via the image segmentation method; and
    applying object shape feature enhancement to the image classification map;
    wherein the step (e) finds the object according to the image classification map which has been processed by the object shape feature enhancement.

2. The auto focus method of claim 1, wherein the step (d) determines the disparities according to a minimum one of the first cost values of each of the image blocks.

3. The auto focus method of claim 1, wherein the image capturing device comprises a lens, the auto focus method further comprising:
    removing the disparities which are not in a reasonable range from the disparity map;
    wherein the reasonable range is determined according to at least one of: a current position of the lens, a maximum position of the lens and a minimum position of the lens.

4. The auto focus method of claim 1, further comprising:
    (g) specifying boundary image blocks of the object after the step (e);
    (h) determining locations of boundaries in the boundary image blocks; and
    (i) computing second cost values of object portions in the boundary image blocks;
    wherein the step (f) further sets the focus location according to the second cost values.

5. The auto focus method of claim 4, wherein the step (h) determines the locations of the boundaries according to mean intensities of neighboring ones of the image blocks of each of the image blocks.

6. The auto focus method of claim 5, wherein the step (h) determines the locations of boundaries via the image segmentation method.

7. The auto focus method of claim 4, further comprising:
    aggregating the first cost values of complete ones of the image blocks of the object and the second cost values to generate aggregated cost values;
    determining an object disparity for each one of the object according to the aggregated cost values;
    wherein the step (f) sets the focus location according to the object parity.

8. An image capturing device, comprising:
    a PD (phase detection) image sensor, configured to sense a sensing image; and
    a processing circuit, configured to perform following steps:
    (a) receiving pixel values of a sensing image sensed by the PD image sensor;
    (b) dividing the sensing image into a plurality of image blocks;
    (c) computing first cost values of each of the image blocks;

(d) determining disparities of each of the image blocks according to the first cost values within a specific range of each of the image blocks;

(e) finding at least one object in the sensing image according to the disparities; and (f) setting a focus location of the image capturing device according to at least one object location of the object:

wherein the processing circuit further performs:

generating a disparity map of the disparities in the step (d), wherein the step (e) finds the object according to the disparity map, wherein the step (e) finds the object via an image segmentation method;

generating an image classification map according to an image segmentation result generated via the image segmentation method; and applying object shape feature enhancement to the image classification map;

wherein the step (e) finds the object according to the image classification map which has been processed by the object shape feature enhancement.

9. The image capturing device of claim 8, wherein the step (d) determines the disparities according to a minimum one of the first cost values of each of the image blocks.

10. The image capturing device of claim 8, wherein the image capturing device comprises a lens, wherein the processing circuit further performs:

removing the disparities which are not in a reasonable range from the disparity map;

wherein the reasonable range is determined according to at least one of: a current position of the lens, a maximum position of the lens and a minimum position of the lens.

11. The image capturing device of claim 8, wherein the processing circuit further performs:

(g) specifying boundary image blocks of the object after the step (e);

(h) determining locations of boundaries in the boundary image blocks; and (i) computing second cost values of object portions in the boundary image blocks;

wherein the step (f) further sets the focus location according to the second cost values.

12. The image capturing device of claim 11, wherein the step (h) determines the locations of the boundaries according to mean intensities of neighboring ones of the image blocks of each of the image blocks.

13. The image capturing device of claim 12, wherein the step (h) determines the locations of boundaries via the image segmentation method.

14. The image capturing device of claim 11, wherein the processing circuit further performs:

aggregating the first cost values of complete ones of the image blocks of the object and the second cost values to generate aggregated cost values;

determining an object disparity for each one of the object according to the aggregated cost values;

wherein the step (f) sets the focus location according to the object parity.

* * * * *

UNITED STATES PATENT AND TRADEMARK OFFICE
CERTIFICATE OF CORRECTION

| | | |
|---|---|---|
| PATENT NO. | : 12,348,866 B2 | Page 1 of 1 |
| APPLICATION NO. | : 18/200589 | |
| DATED | : July 1, 2025 | |
| INVENTOR(S) | : Chun-Hung Chen et al. | |

It is certified that error appears in the above-identified patent and that said Letters Patent is hereby corrected as shown below:

On the Title Page

Item (54) and in the Specification, Column 1, Line 1, correct the title from "AUTO FOCUS METHOD USING IMAGE DISPARITY AND IMAGE CAPTURING DEVICE USING AUTO FOCUS METHOD" to --AUTO FOCUS METHOD USING IMAGE DISPARITY AND IMAGE CAPTURING DEVICE USING THE AUTO FOCUS METHOD--.

Signed and Sealed this
Second Day of September, 2025

Coke Morgan Stewart
*Acting Director of the United States Patent and Trademark Office*